No. 633,159. Patented Sept. 19, 1899.
F. & O. ROSE.
WHEEL HARROW.
(Application filed Apr. 3, 1899.)
(No Model.)
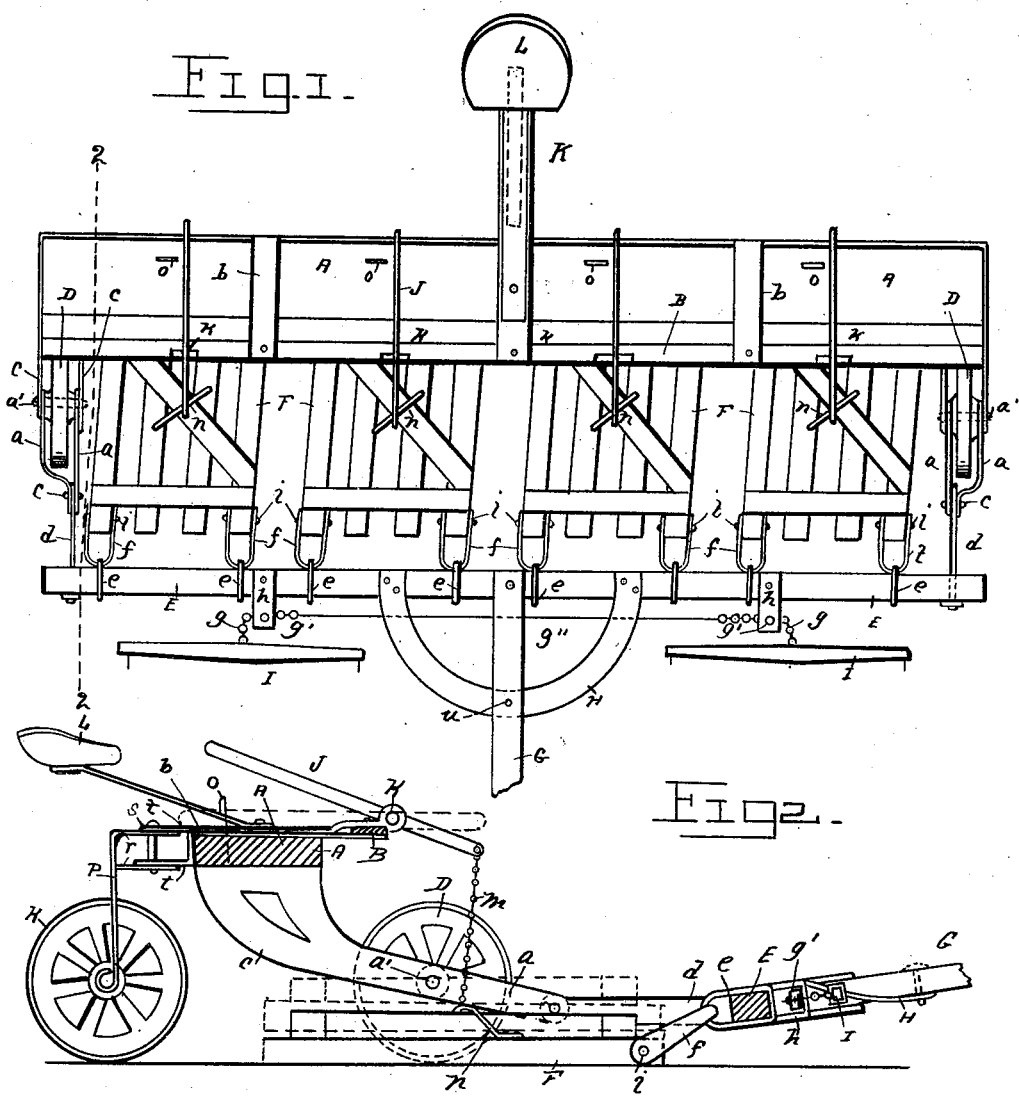

United States Patent Office.

FERDINAND ROSE AND OTTO ROSE, OF JAMES, SOUTH DAKOTA.

WHEEL-HARROW.

SPECIFICATION forming part of Letters Patent No. 633,159, dated September 19, 1899.

Application filed April 3, 1899. Serial No. 711,531. (No model.)

*To all whom it may concern:*

Be it known that we, FERDINAND ROSE and OTTO ROSE, citizens of the United States, residing at James, in the county of Brown, State of South Dakota, have invented certain new and useful Improvements in Drags; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in drags for ground-leveling; and it consists in the construction and arrangement of parts hereinafter set forth, and pointed out particularly in the claims.

The object of the invention is to provide a drag of simple and inexpensive construction in which the arrangement is such as to enable the drag-sections to follow the surface of the ground and at all times lie perfectly in contact therewith, enabling any one of the sections of the drag to move vertically when riding over an elevation without disturbing the other sections of the drag and permitting all of the drag-sections to be raised from the ground when desired. This object is attained by the mechanism illustrated in the accompanying drawings, in which—

Figure 1 is a plan view of our improved drag. Fig. 2 is a transverse section, as on line 2 2 of Fig. 1.

Referring to the letters of reference, A designates the main frame of the drag, which consists of a timber of suitable strength extending longitudinally thereof. Forward of the timber A and spaced therefrom is a metallic bar B, which is maintained in place by the supporting-strips $b$, projecting from the timber or frame A. Depending from the main frame at each end thereof and extending forwardly are the curved forks C, which stand astride of the transporting-wheels D and between which said wheels are journaled. Embracing the forward portion of the transporting-wheels are the links $a$, the rear ends of which are pivoted to the axle $a'$ of the transporting-wheels, while the forward ends of said links are pivoted at $c$ to the rigid arms $d$, which are fast to and extend rearwardly from the bar E, extending longitudinally of the front of the drag.

F designates the sections of the drag, which are of suitable weight and construction and are made to stand slightly oblique. Embracing the front bar E is a series of clips $e$. Passing through said clips are the links $f$, which are pivoted at $i$ to the forward ends of the drag-sections F. Mounted upon the bar E is a tongue G, which is supported upon a circle-bar H.

I designates the whiffletrees, which are attached to the draft-chains $g$, that pass over rollers $g'$, supported in the brackets $h$ of the bar E, the ends of said chains being united by a rod $g''$, whereby an equalization of the draft is effected.

Each of the drag-sections is provided with a lever J, pivoted at $k$ to the frame and having attached to its forward end a chain $m$, whose lower end is attached to a bail $n$ on the drag-section, whereby any one of the drag-sections may be raised by depressing the free end of said lever and may be held in said raised position by engaging the end of said lever under the hook $o$.

To support the rear end of the frame is a trailing-wheel K, mounted in a fork $p$, having a horizontally-projecting head $r$, which is pivoted at $s$ to a bracket $t$, projecting from the rear of the frame, by which arrangement said trailing-wheel is permitted to turn to more perfectly follow the wheeling of the drag when changing the direction of its movement. Projecting rearwardly over the frame is a seat L for the driver.

By means of the pivoted links $a$, which connect the arms $d$ of the bar E with the forks C of the transporting-wheels, said bar is permitted to rise and fall and yet maintain a perfect horizontal plane, and by which arrangement the elevation of either of the transporting-wheels by the passage over an obstruction does not affect the position of said bar E, thereby leaving undisturbed the position of the drag-sections attached thereto. The pivoted links $f$, connecting said drag-sections to said bar E, admit of a free movement of said sections in passing over the ground and permit said sections to conform to the surface of the ground in the operation of the drag.

The tongue G, when the device is being transported along the road, is secured to the circle-bar H by means of a pin $u$; but when in the field said tongue may be made to swing freely by removing said pin.

Having thus fully set forth this invention, what is claimed is—

1. In a drag, the combination of the main frame, the trailing-wheel, the downwardly-curved forks at each end thereof, the transporting-wheels journaled in said forks, the bar crossing the front of the machine, the links connecting said bar with the journals of the transporting-wheels, the independent drag-sections, and the links uniting said sections to said bar.

2. The combination of the main frame, a pivoted trailing-wheel attached to the rear thereof, forwardly-extending forks at the end of said frame, the transporting-wheels journaled in said forks, the independent drag-sections, the forward cross-bar connected to the forks of the transporting-wheels, said drag-sections pivotally connected to said cross-bar, the pivoted levers mounted on the main frame, and the chains connecting said levers with said drag-sections.

3. In a drag, the combination of the main frame, the transporting-wheels, the forward cross-bar pivotally connected with the journals of said wheels, a series of clips upon said bar, a series of independent drag-sections, a series of links passing through said clips and pivoted to said drag-sections, a series of pivoted levers mounted on the frame, and a series of chains connecting said levers with said drag-sections.

In testimony whereof we sign this specification in the presence of two witnesses.

FERDINAND ROSE.
OTTO ROSE.

Witnesses:
 W. B. MILLER,
 ALEXANDER ROSE.